United States Patent
Tsai et al.

(10) Patent No.: US 10,670,701 B2
(45) Date of Patent: Jun. 2, 2020

(54) DYNAMIC ROAD SURFACE DETECTING METHOD BASED ON THREE-DIMENSIONAL SENSOR

(71) Applicant: Automotive Research & Testing Center, Changhua County (TW)

(72) Inventors: Yi-Shueh Tsai, Changhua County (TW); Yu-Fang Wang, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 219 days.

(21) Appl. No.: 15/856,033

(22) Filed: Dec. 27, 2017

(65) Prior Publication Data
US 2019/0178989 A1 Jun. 13, 2019

(30) Foreign Application Priority Data
Dec. 11, 2017 (TW) .............................. 106143402 A

(51) Int. Cl.
*G01S 7/48* (2006.01)
*G01S 17/89* (2020.01)
*G01S 17/42* (2006.01)

(52) U.S. Cl.
CPC ............ *G01S 7/4802* (2013.01); *G01S 17/42* (2013.01); *G01S 17/89* (2013.01)

(58) Field of Classification Search
CPC .................................................... G01S 7/4802
See application file for complete search history.

(56) References Cited

U.S. PATENT DOCUMENTS

| 2010/0121577 | A1* | 5/2010 | Zhang ................ G06K 9/00798 701/301 |
| 2011/0282581 | A1* | 11/2011 | Zeng ..................... G01S 17/936 701/301 |
| 2016/0026184 | A1 | 1/2016 | Stainvas Olshansky et al. |

(Continued)

FOREIGN PATENT DOCUMENTS

| CN | 101629820 A | 1/2010 |
| CN | 104850834 A | 8/2015 |

OTHER PUBLICATIONS

Links Geosolutions, "Family of Mobile Lidar Systems" (Year: 2015).*

*Primary Examiner* — Hyun D Park
(74) *Attorney, Agent, or Firm* — CKC & Partners Co., LLC

(57) ABSTRACT

A dynamic road surface detecting method based on a three-dimensional sensor is provided. The three-dimensional sensor receives a plurality of laser-emitting points reflected from a road surface to generate a plurality of three-dimensional sensor scan point coordinates which is transmitted to a point cloud processing module. The point cloud processing module transforms the three-dimensional sensor scan point coordinates to a plurality of vehicle scan point coordinates according to a coordinate translation equation, and then transforms a plurality of vehicle coordinate height values of the vehicle scan point coordinates to a road surface height reference line according to a folding line fitting algorithm. An absolute difference of two scan point height values of any two adjacent scan points on each of the scan lines is analyzed to generate a discontinuous point. The point cloud processing module links the discontinuous points to form a road boundary.

18 Claims, 15 Drawing Sheets

(56) References Cited

U.S. PATENT DOCUMENTS

| | | | |
|---|---|---|---|
| 2016/0154999 A1* | 6/2016 | Fan | G06K 9/00201 |
| | | | 382/103 |
| 2017/0083763 A1* | 3/2017 | Zang | G06K 9/52 |
| 2018/0276483 A1* | 9/2018 | Zeng | G06T 7/521 |

* cited by examiner

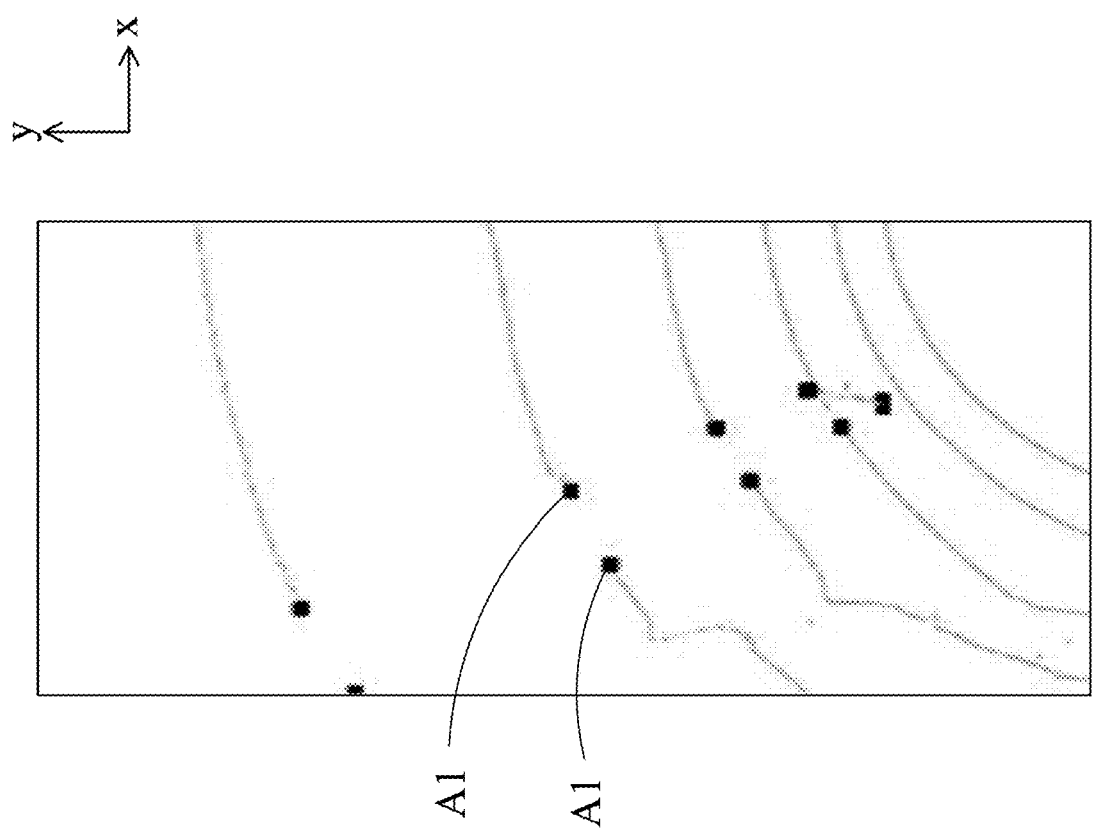

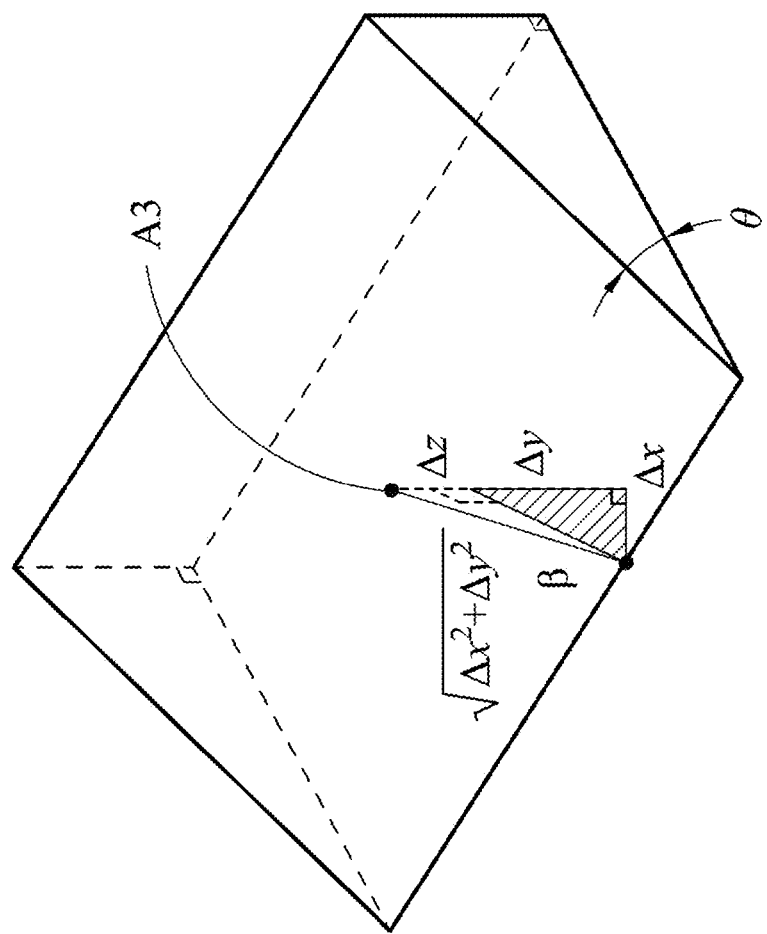
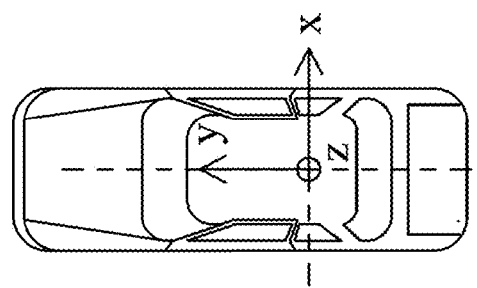
Fig. 8

DYNAMIC ROAD SURFACE DETECTING METHOD BASED ON THREE-DIMENSIONAL SENSOR

RELATED APPLICATIONS

This application claims priority to Taiwan Application Ser. No. 106143402, filed Dec. 11, 2017, which is herein incorporated by reference.

BACKGROUND

Technical Field

The present disclosure relates to a dynamic road surface detecting method. More particularly, the present disclosure relates to a dynamic road surface detecting method based on a three-dimensional sensor.

Description of Related Art

In autonomous driving sensing, it is important to build a reliable perception of the surrounding environment, and conduct precise detection of objects and free road space. Among many proposed approaches satisfying the requirements above, the use of lidar sensor has been proven reliable for its high resolution and precision. With high-frequency laser pulse emission-reception, lidar measures the distance between the sensor and the target points. A 3D lidar combine a rotational device with laser modules to obtain a 3D depth map within its vertical field of view. In the 3D lidar-scanned depth map analysis, ground point classification is a crucial step, as its precision impacts the quality of all following steps.

In the urban road environment, the ground classification consists of detecting a ground surface and a road boundary. Many studies achieve the ground surface and the road boundary detection using high definition 3D lidar, where the generated point cloud data is enough dense and nearly isotropic to be analyzed by assuming that the point cloud distribution is almost isotropic, e.g., mesh-based point cloud analysis combined with local convexity segmentation. Other research may benefit from the planar detection of 2D lidar to detect the ground surface and the road boundary. To deal with high density point clouds, some studies produce a grid map with 3D points using MKV model and LBF algorithm to extracting features of a road surface.

In the case of a lower definition 3D lidar scanner, its approximate 10:1 horizontal-vertical resolution ratio makes mesh grids triangles vertically slender. In addition, the fact that vertically consecutive points are very likely to belong to completely distinct surfaces and different objects, which often makes the distance comparison between them inconclusive and meaningless. In consequence, mesh-based methods are less applicable to the point cloud generated by low resolution lidar.

Compared to 2D lidar, multiple scan layers of 3D lidar produce much richer information. However, these layers are non-planar and have a distinct angle of incline, which makes their detection pattern different from one scan layer to another. Moreover, as the planar assumption become invalid, ground detection methods used in 2D lidar do not apply to the individual scan layer. Another distinction is that 2D lidar based ground detection aim to accumulate scan results over time as the mounted scanner geographically moves with the vehicle on which it is mounted so as to obtain ground area information. If the information can be obtained within a single spin of a 3D lidar and keep the information updated upon each scanning frame, the provided perception will be more instantaneous and secure, and thus more compatible to automated driving scenario requirements.

SUMMARY

According to one aspect of the present disclosure, a dynamic road surface detecting method based on a three-dimensional sensor for detecting a road surface around a vehicle provides a point cloud data acquisition step, a data coordinate transformation step, a height reference line calculating step, a point cloud non-ground analyzing step and a road boundary reconstructing step. The road surface has a ground surface and a road boundary. The data coordinate transformation step is for utilizing the point cloud processing module to transform the three-dimensional sensor scan point coordinates to a plurality of vehicle scan point coordinates according to a coordinate translation equation. The vehicle scan point coordinates are divided into a plurality of scan lines, and each of the scan lines has a plurality of scan points. The height reference line calculating step is for utilizing the point cloud processing module to transform a plurality of vehicle coordinate height values of the vehicle scan point coordinates to a road surface height reference line according to a folding line fitting algorithm. The point cloud non-ground analyzing step provides a scan line continuity analyzing sub-step. The scan line continuity analyzing sub-step is for utilizing the point cloud processing module to analyze an absolute difference of two scan point height values of any two adjacent scan points on each of the scan lines. When the absolute difference is greater than a predetermined difference value, each of the two adjacent scan points is regarded as a discontinuous point. The road boundary reconstructing step is for utilizing the point cloud processing module to link the discontinuous points to form the road boundary.

According to another aspect of the present disclosure, a dynamic road surface detecting method based on a three-dimensional sensor for detecting a road surface around a vehicle provides a point cloud data acquisition step, a data coordinate transformation step, a height reference line calculating step, a point cloud non-ground analyzing step and a road boundary reconstructing step. The road surface has a ground surface and a road boundary. The point cloud data acquisition step is for providing the three-dimensional sensor to emit a plurality of laser-emitting points to the road surface, and then the three-dimensional sensor receives the laser-emitting points reflected from the road surface to generate a plurality of three-dimensional sensor scan point coordinates and transmits the three-dimensional sensor scan point coordinates to a point cloud processing module. The data coordinate transformation step is for utilizing the point cloud processing module to transform the three-dimensional sensor scan point coordinates to a plurality of vehicle scan point coordinates according to a coordinate translation equation. The vehicle scan point coordinates are divided into a plurality of scan lines, and each of the scan lines has a plurality of scan points. The height reference line calculating step is for utilizing the point cloud processing module to transform a plurality of vehicle coordinate height values of the vehicle scan point coordinates to a road surface height reference line according to a folding line fitting algorithm. The point cloud non-ground analyzing step provides a scan line smoothness analyzing sub-step. The scan line smoothness analyzing sub-step is for utilizing the point cloud processing module to analyze the scan points of each of the scan lines to generate a smoothness criterion equation. The point cloud processing module stores a predetermined non-smooth point condition value and compares the smoothness criterion equation with the predetermined non-smooth point condition value. When the smoothness criterion equation is greater than the predetermined non-smooth point condition value, each of the scan points corresponding to the smoothness criterion equation is regarded as a non-smooth point. The road boundary reconstructing step is for utilizing the point cloud processing module to link the non-smooth points to form the road boundary.

BRIEF DESCRIPTION OF THE DRAWINGS

The present disclosure can be more fully understood by reading the following detailed description of the embodiment, with reference made to the accompanying drawings as follows:

FIG. 6 shows a schematic view of a scan line continuity analyzing sub-step of a point cloud non-ground analyzing step of FIG. 1;

FIG. 8 shows a schematic view of a scan line slope analyzing sub-step of the point cloud non-ground analyzing step of FIG. 1;

DETAILED DESCRIPTION

Figure 1:
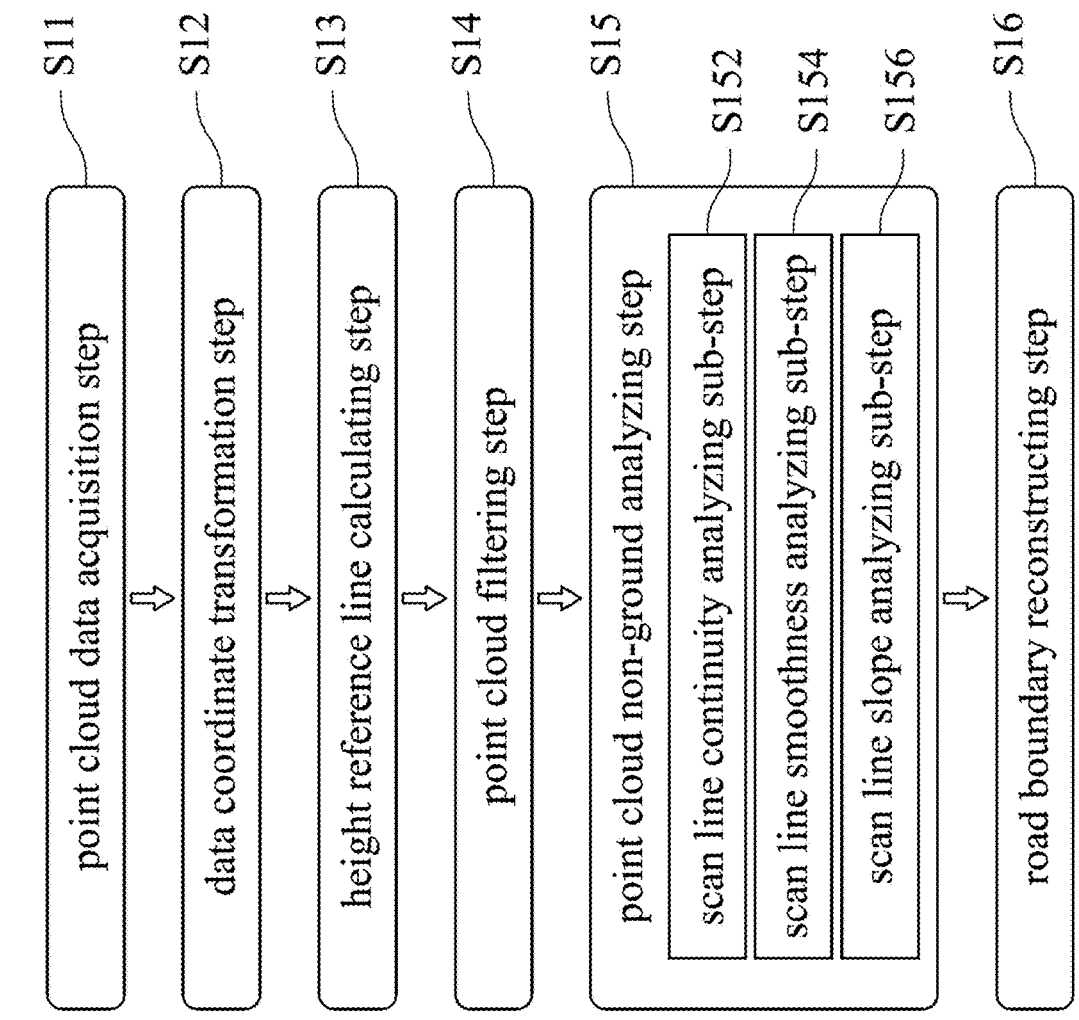
FIG. 1 shows a flow chart of a dynamic road surface detecting method based on a three-dimensional sensor according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
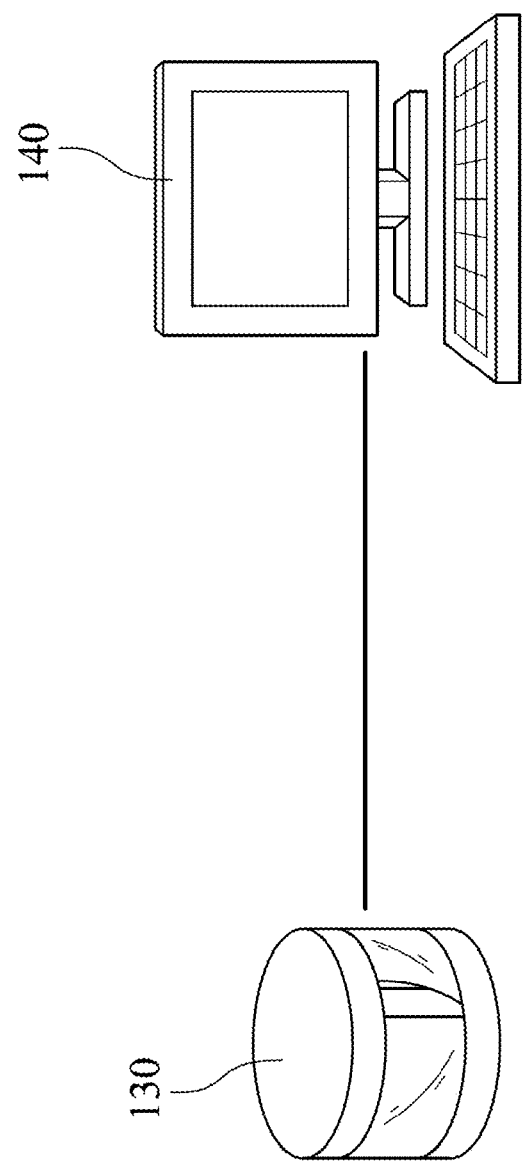
FIG. 2 shows a schematic view of a point cloud data acquisition step of FIG. 1.
Figure 3:
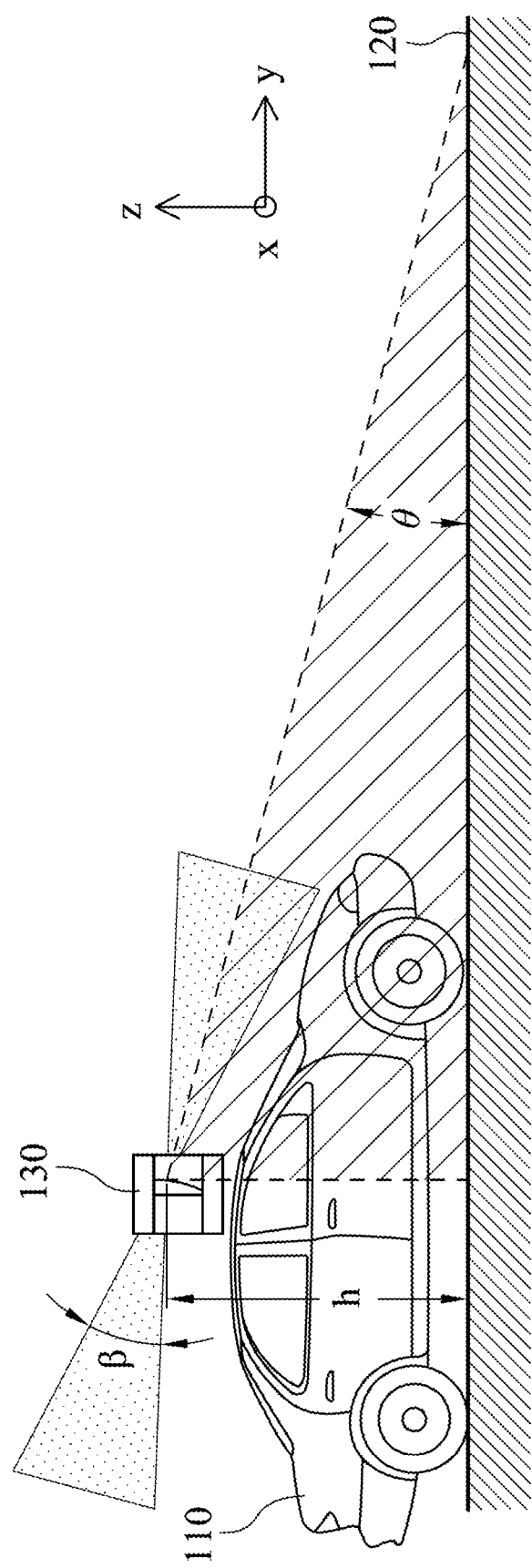
FIG. 3 shows a schematic view of a data coordinate transformation step of FIG. 1.
Figure 4A:
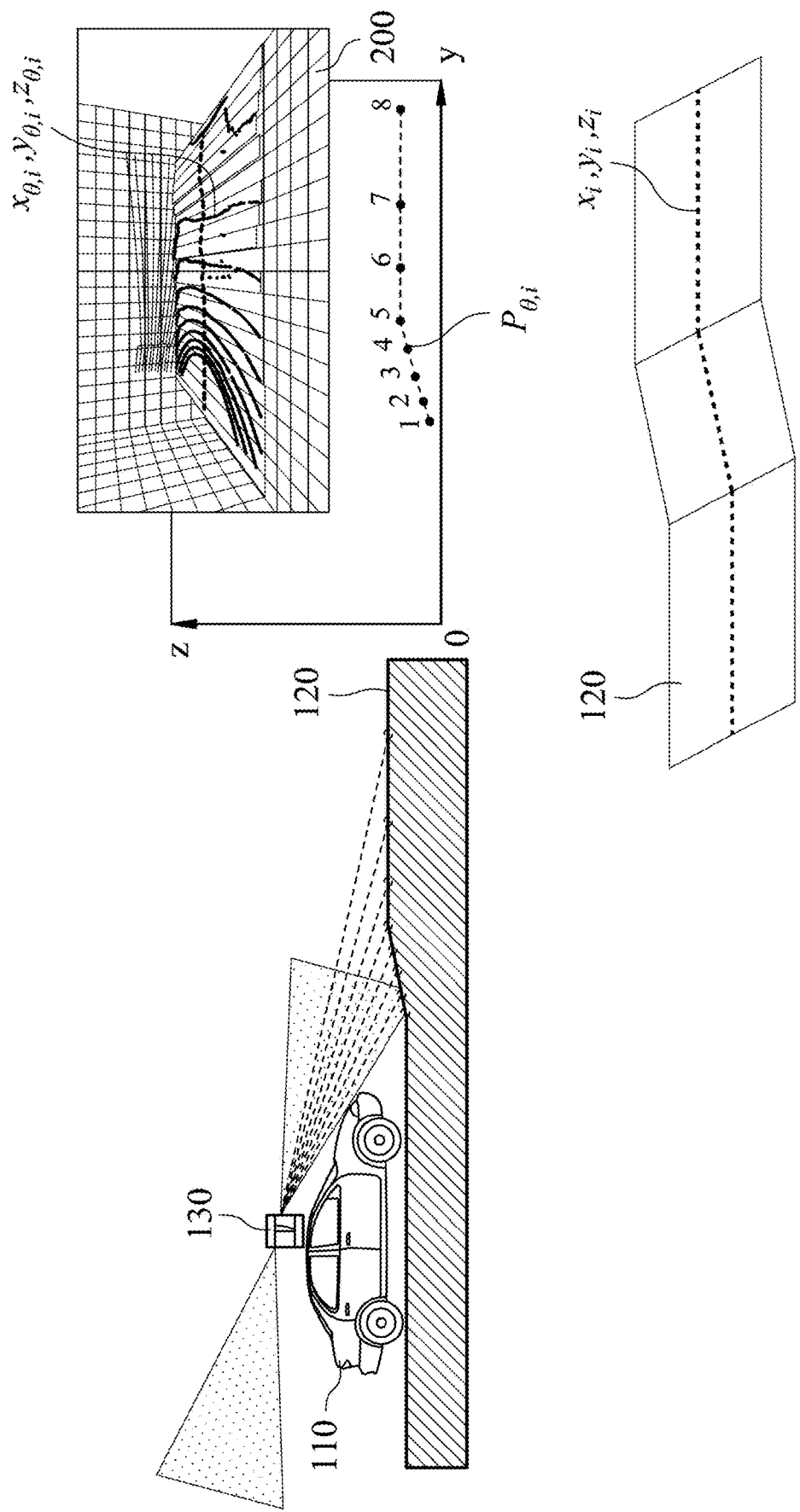
FIG. 4A shows a schematic view of a height reference line calculating step of FIG. 1.
Figure 4B:
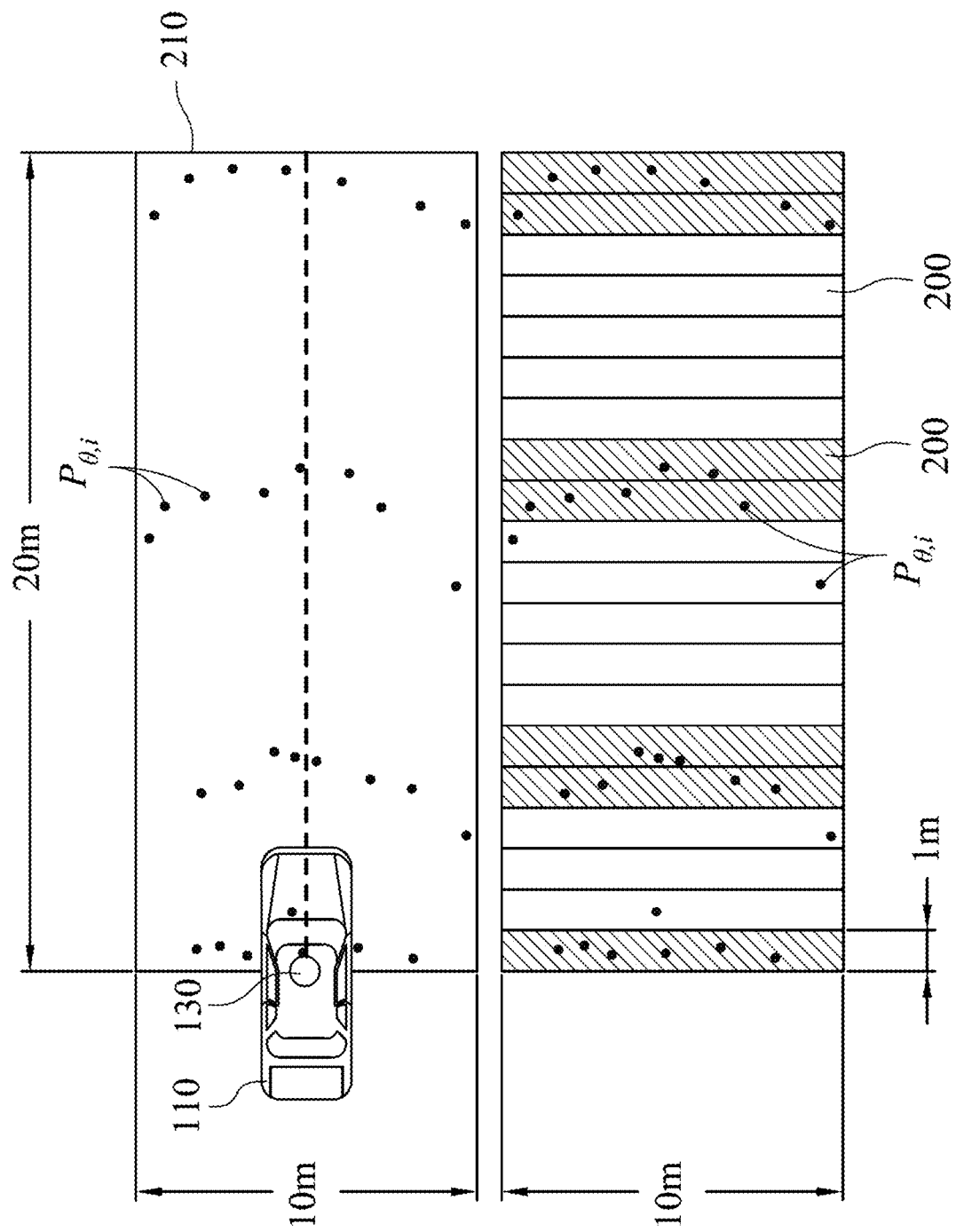
FIG. 4B shows a schematic view of a plurality of panes of the height reference line calculating step of FIG. 4A.
Figure 4C:
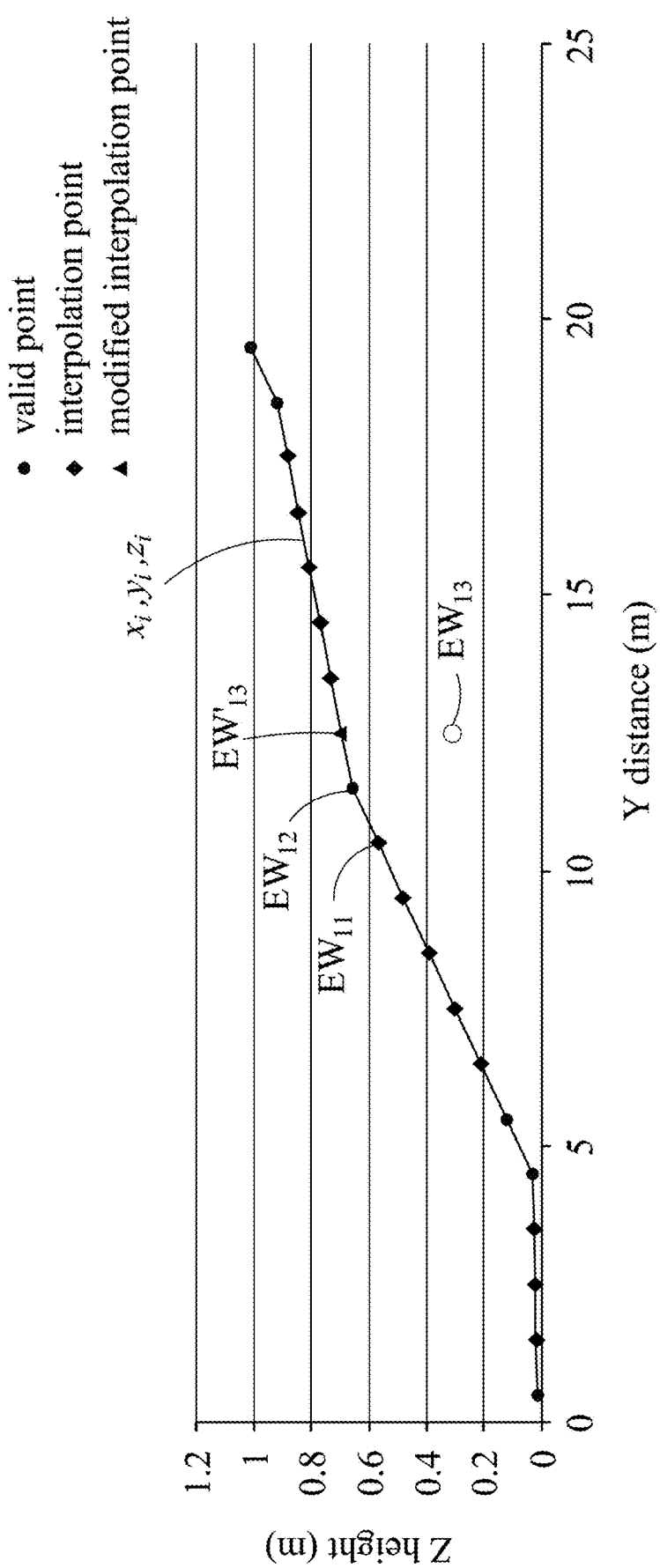
FIG. 4C shows a schematic view of a road surface height reference line of the height reference line calculating step of FIG. 4B.
Figure 5A:
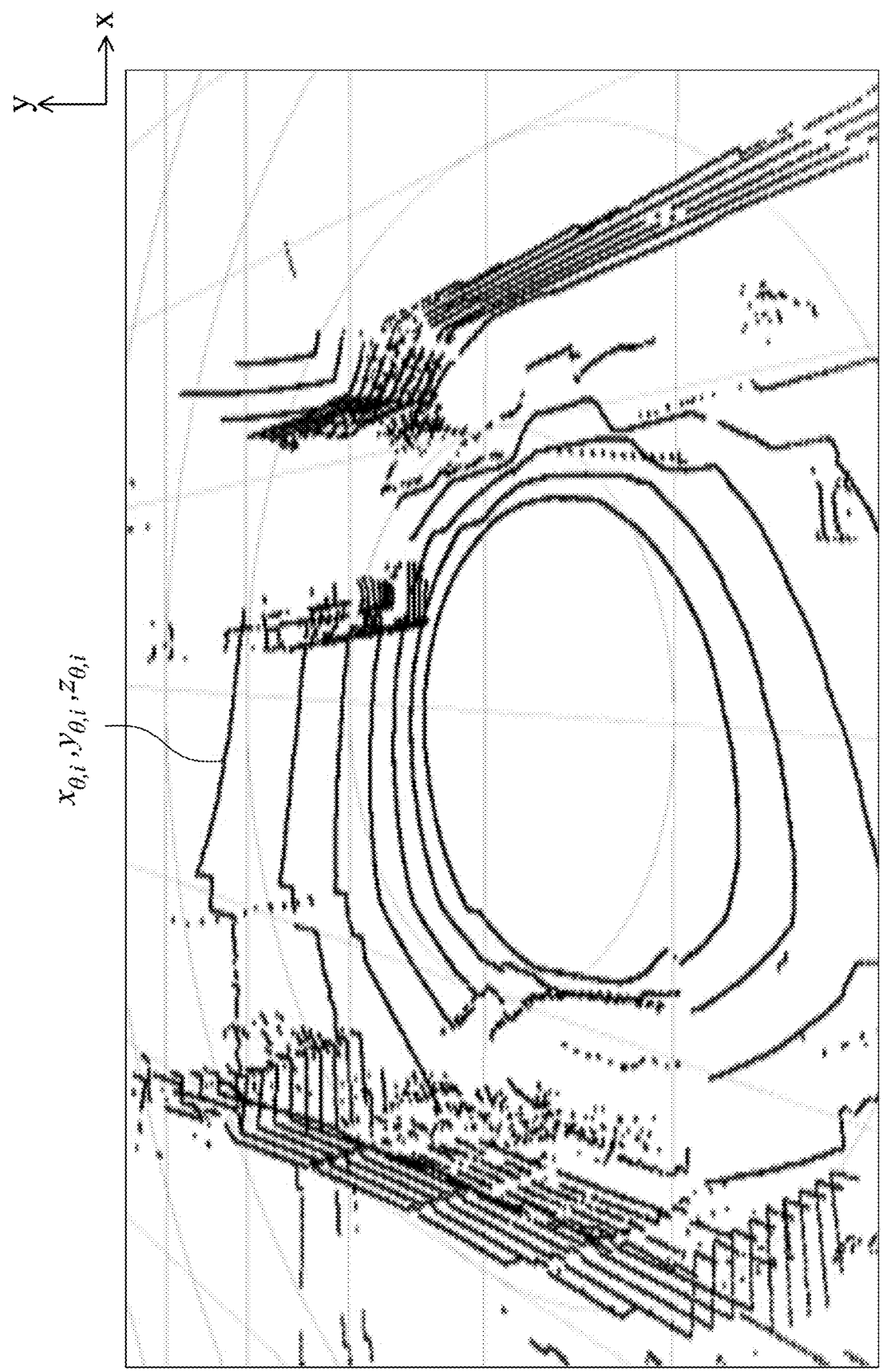
FIG. 5A shows a schematic view of a plurality of scan lines before performing a point cloud filtering step of FIG. 1.
Figure 5B:
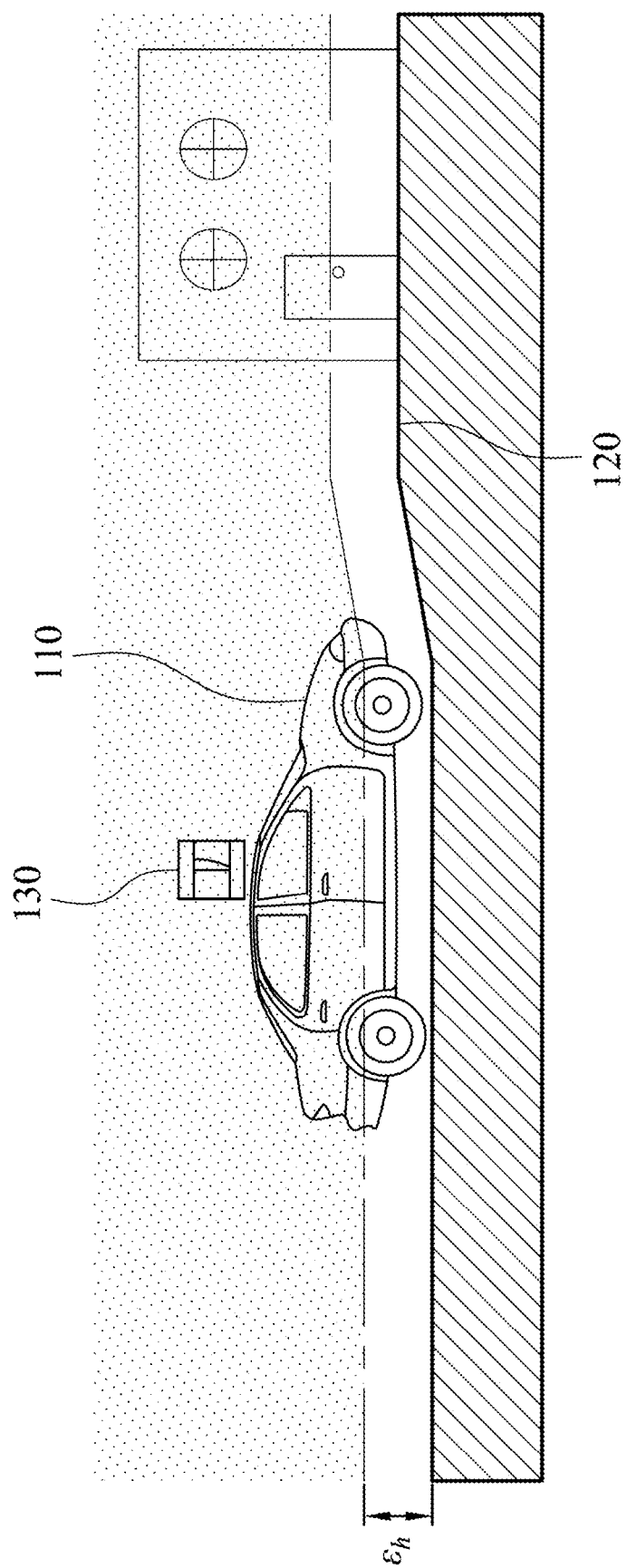
FIG. 5B shows a schematic view of the point cloud filtering step of FIG. 1.
Figure 5C:
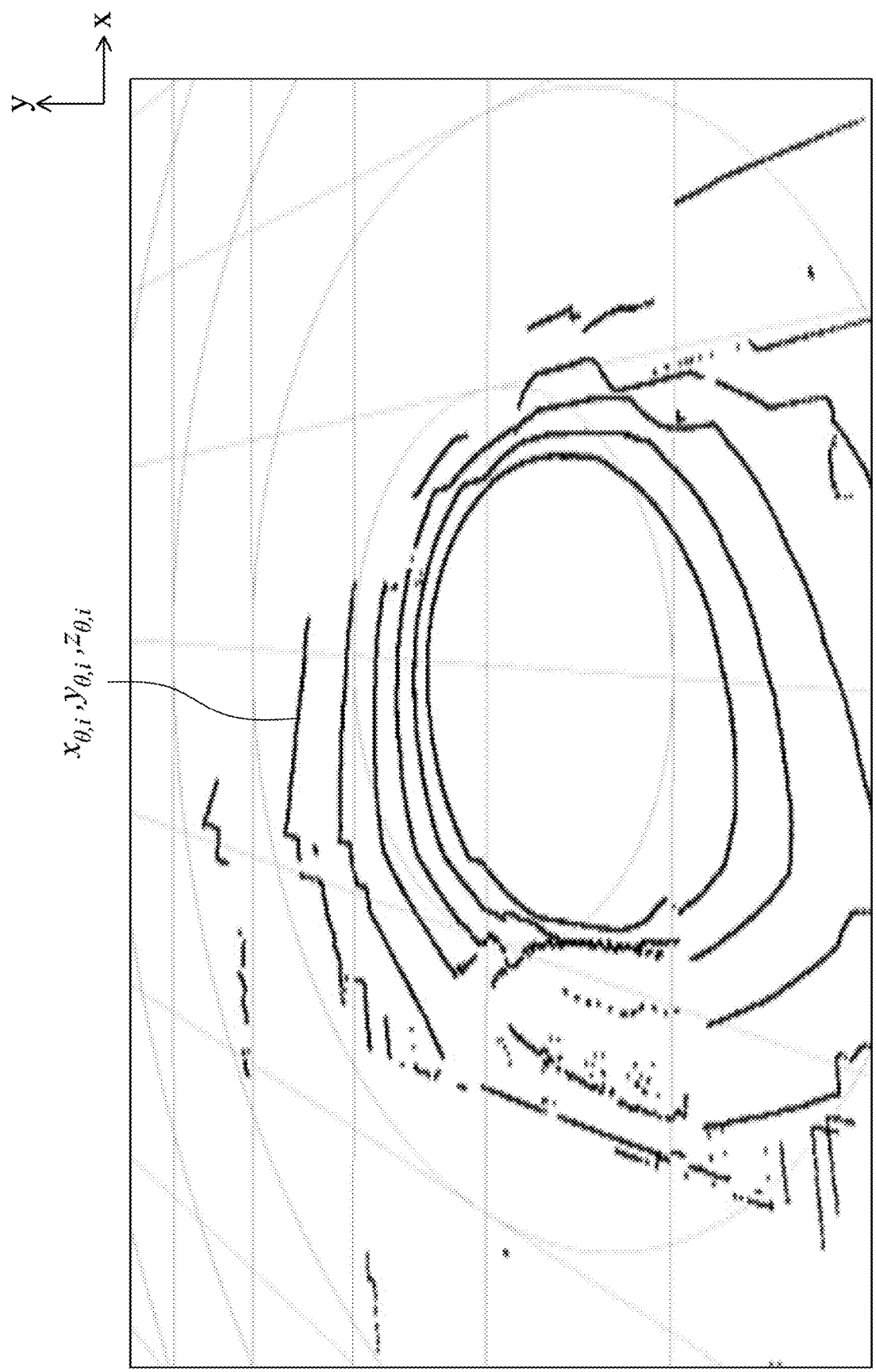
FIG. 5C shows a schematic view of the scan lines after performing the point cloud filtering step of FIG. 1.
Figure 7:
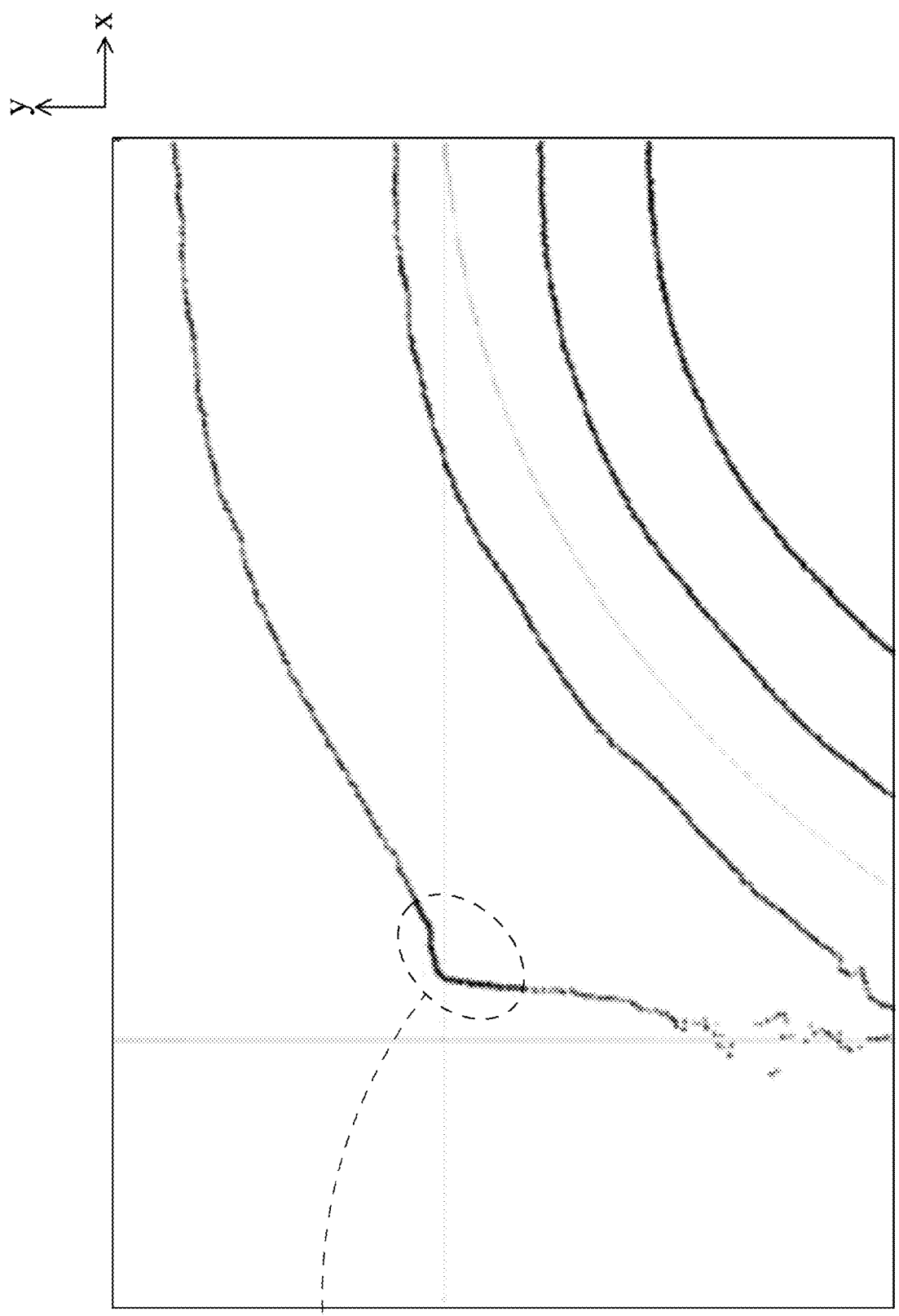
FIG. 7 shows a schematic view of a scan line smoothness analyzing sub-step of the point cloud non-ground analyzing step of FIG. 1.
Figure 9:
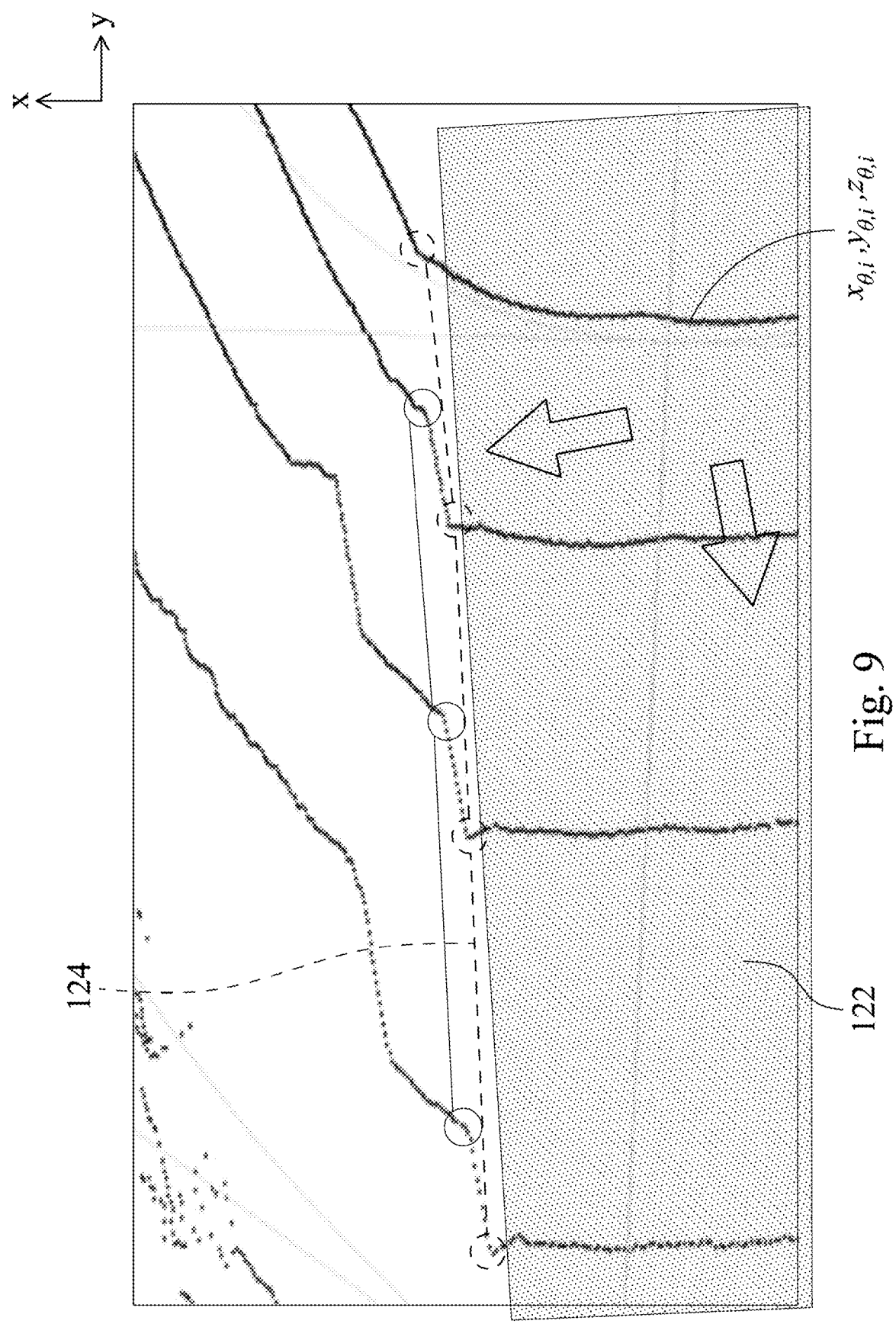
FIG. 9 shows a schematic view of a road boundary reconstructing step of FIG. 1.

FIG. 1 shows a flow chart of a dynamic road surface detecting method 100 based on a three-dimensional sensor 130 according to one embodiment of the present disclosure; FIG. 2 shows a schematic view of a point cloud data acquisition step S11 of FIG. 1; FIG. 3 shows a schematic view of a data coordinate transformation step S12 of FIG. 1; FIG. 4A shows a schematic view of a height reference line calculating step S13 of FIG. 1; FIG. 4B shows a schematic view of a plurality of panes 200 of the height reference line calculating step S13 of FIG. 4A; FIG. 4C shows a schematic view of a road surface height reference line $(x_i, y_i, z_i)$ of the height reference line calculating step S13 of FIG. 4B; FIG. 5A shows a schematic view of a plurality of scan lines $(x_{\theta,i}, y_{\theta,i}, z_{\theta,i})$ before performing a point cloud filtering step S14 of FIG. 1; FIG. 5B shows a schematic view of the point cloud filtering step S14 of FIG. 1; FIG. 5C shows a schematic view of the scan lines $(x_{\theta,i}, y_{\theta,i}, z_{\theta,i})$ after performing the point cloud filtering step S14 of FIG. 1; FIG. 6 shows a schematic view of a scan line continuity analyzing sub-step S152 of a point cloud non-ground analyzing step S15 of FIG. 1; FIG. 7 shows a schematic view of a scan line smoothness analyzing sub-step S154 of the point cloud non-ground analyzing step S15 of FIG. 1; FIG. 8 shows a schematic view of a scan line slope analyzing sub-step S156 of the point cloud non-ground analyzing step S15 of FIG. 1; and FIG. 9 shows a schematic view of a road boundary reconstructing step S16 of FIG. 1. In FIGS. 1-9, the dynamic road surface detecting method 100 based on the three-dimensional sensor 130 is utilized to detect a road surface 120 around a vehicle 110. The road surface 120 has a ground surface 122 and a road boundary 124. The dynamic road surface detecting method 100 based on the three-dimensional sensor 130 provides the point cloud data acquisition step S11, the data coordinate transformation step S12, the height reference line calculating step S13, the point cloud filtering step S14, the point cloud non-ground analyzing step S15 and the road boundary reconstructing step S16.

The point cloud data acquisition step S11 is for providing the three-dimensional sensor 130 to emit a plurality of laser-emitting points to the road surface 120, and then the three-dimensional sensor 130 receives the laser-emitting points reflected from the road surface 120 to generate a plurality of three-dimensional sensor scan point coordinates (x',y',z') and transmits the three-dimensional sensor scan point coordinates (x',y',z') to a point cloud processing module 140, as shown in FIG. 2. In detail, the three-dimensional sensor 130 includes a three-dimensional light detection and ranging (LIDAR) sensor. The three-dimensional LIDAR sensor has a horizontal viewing angle, a vertical viewing angle θ and a rotational frequency. The horizontal viewing angle represents a field-of-view (FOV) in a vertical direction. The vertical viewing angle θ represents the field-of-view in a horizontal direction. In one embodiment, the three-dimensional LIDAR sensor is a VELODYNE VLP-16 real-time 3D LIDAR sensor, manufactured by Velodyne Acoustics, Inc. The VELODYNE VLP-16 real-time 3D LIDAR sensor creates 360 degrees 3D images by using 16 laser/detector pairs, i.e., the horizontal viewing angle is equal to 360 degrees, and the number of the vertical viewing angles θ is 16. Each of the vertical viewing angles θ is equal to or greater than −15 degrees and is equal to or smaller than +15 degrees. The rotational frequency is equal to 10 Hz. The three-dimensional LIDAR sensor is signally connected to the point cloud processing module 140 through an Ethernet cable. The data scanned by the three-dimensional LIDAR sensor (VLP-16) is transmitted through the Ethernet cable to the point cloud processing module 140, which in one embodiment is a laptop. In 10 Hz rotation, each spin of the three-dimensional LIDAR sensor takes 0.1 second and generates about 28,000 three-dimensional sensor scan point coordinates (x',y',z') of surrounding environment (i.e., the road surface 120). Yet there will be a 0.1 second detection time discontinuity gap across the end and beginning of the scan. For autonomous driving application, front scanning is considered the most important, so it is wise to choose the rear of the scanning to be the boundary of a frame. Moreover, the vertical viewing angles θ of the three-dimensional LIDAR sensor (VLP-16) are set between −15 degrees and +15 degrees. In other words, the vertical viewing angles θ are −15 degrees, −13 degrees, −11 degrees, −9 degrees, −7 degrees, −5 degrees, −3 degrees, −1 degrees, +1 degrees, +3 degrees, +5 degrees, +7 degrees, +9 degrees, +11 degrees, +13 degrees and +15 degrees, respectively. In addition, the point cloud processing module 140 may be a personal computer, an electronic control unit (ECU), a microprocessor, or other electronic controllers for use in the vehicle. In one embodiment, the point cloud processing module 140 utilizes the personal computer for processing.

The data coordinate transformation step S12 is for utilizing the point cloud processing module 140 to transform the three-dimensional sensor scan point coordinates (x',y',z') to a plurality of vehicle scan point coordinates (x,y,z) according to a coordinate translation equation, as shown in FIG. 3. In detail, the vehicle scan point coordinates (x,y,z) are divided into a plurality of scan lines $(x_{\theta,i}, y_{\theta,i}, z_{\theta,i})$, and each of the scan lines $(x_{\theta,i}, y_{\theta,i}, z_{\theta,i})$ has a plurality of scan points $P_{\theta,i}$. The coordinate translation equation includes the vertical viewing angle θ (pitch angle), a roll angle β, a height h, the three-dimensional sensor scan point coordinates (x',y',z') and the vehicle scan point coordinates (x,y,z). The coordinate translation equation is described as follows:

$$\begin{bmatrix} x \\ y \\ z \end{bmatrix} = \begin{bmatrix} 0 \\ 0 \\ h \end{bmatrix} + \begin{bmatrix} \cos\beta & 0 & \sin\beta \\ 0 & 1 & 0 \\ -\sin\beta & 0 & \cos\beta \end{bmatrix} \times \begin{bmatrix} 1 & 0 & 0 \\ 0 & \cos\theta & \sin\theta \\ 0 & -\sin\theta & \cos\theta \end{bmatrix} \times \begin{bmatrix} x' \\ y' \\ z' \end{bmatrix}. \quad (1)$$

The height reference line calculating step S13 is for utilizing the point cloud processing module 140 to transform a plurality of vehicle coordinate height values z of the vehicle scan point coordinates (x,y,z) to a road surface height reference line $(x_i, y_i, z_i)$ according to a folding line fitting algorithm, as shown in FIG. 4A-4C. In detail, the folding line fitting algorithm is for equally dividing a region 210 of the road surface 120 into a plurality of panes 200 along a traveling direction. Some of the scan points $P_{\theta,i}$ are located in the region 210. Each of some of the panes 200 has at least one of the scan points $P_{\theta,i}$. The point cloud processing module 140 stores a predetermined valid pane point number value and counts a scan point number value which represents the number of the scan points $P_{\theta,i}$ of the vehicle scan point coordinates (x,y,z) located in each of the panes 200, and then the point cloud processing module 140 compares the predetermined valid pane point number value with the scan point number value. When the scan point number value is greater than the predetermined valid pane point number value, the pane 200 corresponding to the scan point number value is regarded as a valid pane by the point cloud processing module 140. On the contrary, when the scan point number value is smaller than or equal to the predetermined valid pane point number value, the pane 200 corresponding to the scan point number value is regarded as an invalid pane by the point cloud processing module 140. The scan point $P_{\theta,i}$ represents an i-th scan point of the scan line $(x_{\theta,i}, y_{\theta,i}, z_{\theta,i})$ of the vehicle scan point coordinates (x,y,z) corresponding to the vertical viewing angle θ. Moreover, in the folding line fitting algorithm, the point cloud processing module 140 stores a predetermined reference road slope and selects a minimum vehicle coordinate height value $z_{min}$ from the vehicle coordinate height values z of the vehicle scan point coordinates (x,y,z) in each of the valid panes. The point cloud processing module 140 links two central points of two adjacent valid panes to form a central linking line. The two heights of the two central points are equal to two minimum vehicle coordinate height values $z_{min}$ of the two adjacent valid panes, respectively. The central linking line has a linking slope, and the point cloud processing module 140 compares the linking slope with the predetermined reference road slope. When the linking slope is greater than the predetermined reference road slope, one of the two valid panes which is farther away from the vehicle 110 is regarded as a retrial invalid pane, and the other of the two valid panes is regarded as a retrial valid pane by the point cloud processing module 140. On the contrary, when the linking slope is smaller than or equal to the predetermined reference road slope, each of the two valid panes is regarded as the retrial valid pane by the point cloud processing module 140. Furthermore, in the folding line fitting algorithm, the point cloud processing module 140 performs an interpolation algorithm to interpolate the retrial invalid panes and the invalid panes according to the retrial valid panes to generate the road surface height reference line $(x_i, y_i, z_i)$.

For example, in FIGS. 4A-4C, the height reference line calculating step S13 decomposes a region 210 of the road surface 120 in front of the vehicle 110 into a plurality of panes 200. The region 210 is a rectangular area of 10 m (width, x-direction)×20 m (length, y-direction). Each of the panes 200 is a 10 m×1 m block. For each of the panes 200, if the number of the scan points $P_{\theta,i}$ is smaller than or equal to the predetermined valid pane point number value, the corresponding pane 200 is regarded as the invalid pane. In one embodiment, the predetermined valid pane point number value is set to 1. The number of the scan points $P_{\theta,i}$ is not enough in the invalid pane. Then, the point cloud processing module 140 stores a predetermined reference road slope and selects a minimum vehicle coordinate height value $z_{min}$ from the vehicle coordinate height values z of the scan points $P_{\theta,i}$ of the vehicle scan point coordinates (x,y,z) in each of the valid panes. In addition, the point cloud processing module 140 performs the folding line fitting algorithm from near to far. If a first pane 200 which is nearest to the vehicle 110 is the valid pane, a starting point of the road surface height reference line $(x_i, y_i, z_i)$ is set to (0, 0.5, $z_{min}$), and the starting point is regarded as a "valid point". The valid point is represented by a circular symbol (e.g., $EW_{12}$ in FIG. 4C). If the first pane 200 which is nearest to the vehicle 110 is the invalid pane, the starting point of the road surface height reference line $(x_i, y_i, z_i)$ is set to (0, 0.5, 0). Moreover, the point cloud processing module 140 links two central points of two adjacent valid panes to form a central linking line. The two heights of the two central points are equal to two minimum vehicle coordinate height values $z_{min}$ of the two adjacent valid panes, respectively. The central linking line has a linking slope, and the point cloud processing module 140 compares the linking slope with the predetermined reference road slope. When the linking slope is greater than the predetermined reference road slope, one of the two valid panes which is farther away from the vehicle 110 is regarded as a retrial invalid pane, and the other of the two valid panes is regarded as a retrial valid pane by the point cloud processing module 140. In one embodiment, the predetermined reference road slope is set to 25%. There is a certain probability that the retrial invalid pane is the road boundary 124 or the obstacle. In FIG. 4C, a twelfth pane 200 and a thirteenth pane 200 are initially both valid panes and generate the valid points $EW_{12}$, $EW_{13}$, respectively. However, the central linking line of the valid points $EW_{12}$, $EW_{13}$ has the linking slope which is greater than the predetermined reference road slope, and the valid point $EW_{13}$ which is farther away from the vehicle 110 is regarded as the retrial invalid pane. Furthermore, if the linking slope which is smaller than or equal to the predetermined reference road slope, each of the two valid panes is regarded as the retrial valid pane by the point cloud processing module 140. The point cloud processing module 140 performs the interpolation algorithm to interpolate the retrial invalid panes and the invalid panes according to the retrial valid panes to generate the road surface height reference line $(x_i, y_i, z_i)$. Each of the points produced by interpolation of the invalid panes is regarded as an "interpolation point" which is represented by a diamond symbol (e.g., $EW_{11}$ in FIG. 4C). Each of the points produced by interpolation of the retrial invalid panes is a "modified interpolation point" which is represented by a triangular symbol (e.g., $EW'_{13}$ in FIG. 4C). In other words, the valid point $EW_{12}$ is modified to the modified interpolation point $EW'_{13}$ by the interpolation algorithm. In addition, the last pane 200 (i.e., a twentieth pane 200) is the invalid pane, the point cloud processing module 140 performs a horizontal extension according to the minimum vehicle coordinate height values $z_{min}$ of the farthest valid panes, so that the height of the last pane 200 is equal to the minimum vehicle coordinate height values $z_{min}$ of the farthest valid panes. Finally, all of the panes 200 are accomplished by the folding line fitting algorithm to from the road surface height reference line $(x_i, y_i, z_i)$.

The point cloud filtering step S14 is for utilizing the point cloud processing module 140 to filter the vehicle scan point coordinates (x,y,z). The point cloud processing module 140 stores a predetermined filtering height $\varepsilon_h$ and generate a filtering line according to the predetermined filtering height $\varepsilon_h$ and the road surface height reference line $(x_i, y_i, z_i)$. The filtering line has a filtering line height value $(z_i + \varepsilon_h)$, as shown in FIG. 5B. In addition, the point cloud processing module 140 removes a part of the scan points $P_{\theta,i}$ if the vehicle coordinate height values z of the part of the scan points $P_{\theta,i}$ are greater than the filtering line height value $(z_i + \varepsilon_h)$. The predetermined filtering height $\varepsilon_h$ is preferably from 5 to 30 cm, more preferably from 15 to 20 cm. In one embodiment, the predetermined filtering height $\varepsilon_h$ is 18 cm. Therefore, the point cloud filtering step S14 of the present disclosure can remove redundant scan points $P_{\theta,i}$, thus greatly decreasing computational time and improving computational efficiency.

The point cloud non-ground analyzing step S15 provides a scan line continuity analyzing sub-step S152, a scan line smoothness analyzing sub-step S154 and a scan line slope analyzing sub-step S156. The scan line continuity analyzing sub-step S152 is for utilizing the point cloud processing module 140 to analyze an absolute difference of two scan point height values $z_{\theta, i+1}$, $z_{\theta, i}$ of any two adjacent scan points $P_{\theta,i}$ on each of the scan lines $(x_{\theta,i}, y_{\theta,i}, z_{\theta,i})$. When the absolute difference is greater than a predetermined difference value $\varepsilon_c$, each of the two adjacent scan points $P_{\theta,i}$ is regarded as a discontinuous point A1. In addition, the scan line smoothness analyzing sub-step S154 is for utilizing the point cloud processing module 140 to analyze the scan points $P_{\theta,i}$ of each of the scan lines $(x_{\theta,i}, y_{\theta,i}, z_{\theta,i})$ to generate a smoothness criterion equation SC. The smoothness condition equation SC includes a left slope $S_{i,k,left}$ and a right slope $S_{i,k,right}$. The point cloud processing module 140 stores a predetermined non-smooth point condition value $\varepsilon_S$ and compares the smoothness criterion equation SC with the predetermined non-smooth point condition value $\varepsilon_S$. The smoothness criterion equation SC is described as follows:

$$SC = \left| \frac{S_{i,k,right} - S_{i,k,left}}{1 + S_{i,k,right} \times S_{i,k,left}} \right|. \tag{2}$$

When the smoothness criterion equation SC is greater than the predetermined non-smooth point condition value $\varepsilon_S$, each of the scan points $P_{\theta,i}$ corresponding to the smoothness criterion equation SC is regarded as a non-smooth point A2. Moreover, the scan line slope analyzing sub-step S156 is for utilizing the point cloud processing module 140 to analyze the scan points $P_{\theta,i}$ of each of the scan lines $(x_{\theta,i}, y_{\theta,i}, z_{\theta,i})$ to generate a slope criterion equation SR. The point cloud processing module 140 stores a predetermined tolerable slope condition value $\varepsilon_r$ and compares the slope criterion equation SR with the predetermined tolerable slope condition value. The two coordinates of the two adjacent scan points $P_{\theta,i}$ on each of the scan lines $(x_{\theta,i}, y_{\theta,i}, z_{\theta,i})$ are represented as $(x_{\theta,j}, y_{\theta,j}, z_{\theta,j})$ and $(x_{\theta,j+1}, y_{\theta,j+1}, z_{\theta,j+1})$, respectively, and the slope criterion equation SR is described as follows:

$$SR = \frac{|z_{\theta,j+1} - z_{\theta,j}|}{\sqrt{(x_{\theta,j+1} - x_{\theta,j})^2 + (y_{\theta,j+1} - y_{\theta,j})^2}}. \tag{3}$$

When the slope criterion equation SR is greater than the predetermined tolerable slope condition value $\varepsilon_r$, each of the scan points $P_{\theta,i}$ corresponding to the slope criterion equation SR is regarded as a large slope point A3. $|z_{\theta,i+1} - z_{\theta,i}|$ is represented as $\Delta z$. $(x_{\theta,i+1} - x_{\theta,i})$ is represented as $\Delta x$. $(y_{\theta,j+1} - y_{\theta,j})$ is represented as $\Delta y$. In FIG. 1, the sub-steps of the point cloud non-ground analyzing step S15 is carried out in order of the scan line continuity analyzing sub-step S152, the scan line smoothness analyzing sub-step S154 and the scan line slope analyzing sub-step S156 to generate the discontinuous points A1, the non-smooth points A2 and the large slope points A3, respectively. The discontinuous points A1, the non-smooth points A2 or the large slope points A3 may include one or more scan points $P_{\theta,i}$ and are regarded as the boundary between the road boundary 124 and the ground surface 122 or the boundary between the obstacle and the ground surface 122. Accordingly, the scan line continuity analyzing sub-step S152, the scan line smoothness analyzing sub-step S154 and the scan line slope analyzing sub-step S156 of the present disclosure can efficiently and instantaneously obtain the scan points $P_{\theta,i}$ of the road boundary 124 or the obstacle.

The road boundary reconstructing step S16 is for utilizing the point cloud processing module 140 to link the discontinuous points A1, the non-smooth points A2 and the large slope points A3 to form the road boundary 124. In detail, the point cloud processing module 140 first removes noise of the scan points $P_{\theta,i}$ corresponding to the discontinuous points A1, the non-smooth points A2 and the large slope points A3. Then, the point cloud processing module 140 synthesizes the discontinuous points A1, the non-smooth points A2 and the large slope points A3 into a plurality of road boundary segments or a plurality of obstacle segments. Second, the point cloud processing module 140 systematically reconstructs the road boundary segments or the obstacle segments to form the road boundary 124 or the obstacle according to light straightness, a scan order, continuity of the ground surface 122 and continuity of the road boundary 124. Third, the point cloud processing module 140 performs a region-growing method to find the ground surface 122. The region-growing method is configured to generate the ground surface 122 expanding from a selected seed point. The region growing method based on the seed point (manually defined or automatically chosen) is a technique in common use in which the process is started by choosing an arbitrary seed pixel and comparing it with neighboring pixels. A region is grown around the seed pixel by adding in neighboring pixels that are similar, increasing the size of the region. When the growth of one region stops, another seed pixel is chosen that does not yet belong to any region and the growing process is repeated. A selecting-growing process is iterated until all pixels belong to some region. The region-growing method can give very good segmentations that correspond well to the observed edges. Therefore, the dynamic road surface detecting method 100 combined with the region-growing method of the present disclosure can effectively obtain a precise area of the ground surface 122, so that the dynamic road surface detecting method 100 can be used for autonomous driving and improving accuracy of the obstacle detection and object classification by removing the area of the ground surface 122, thereby significantly increasing driving safety.

Figure 10:
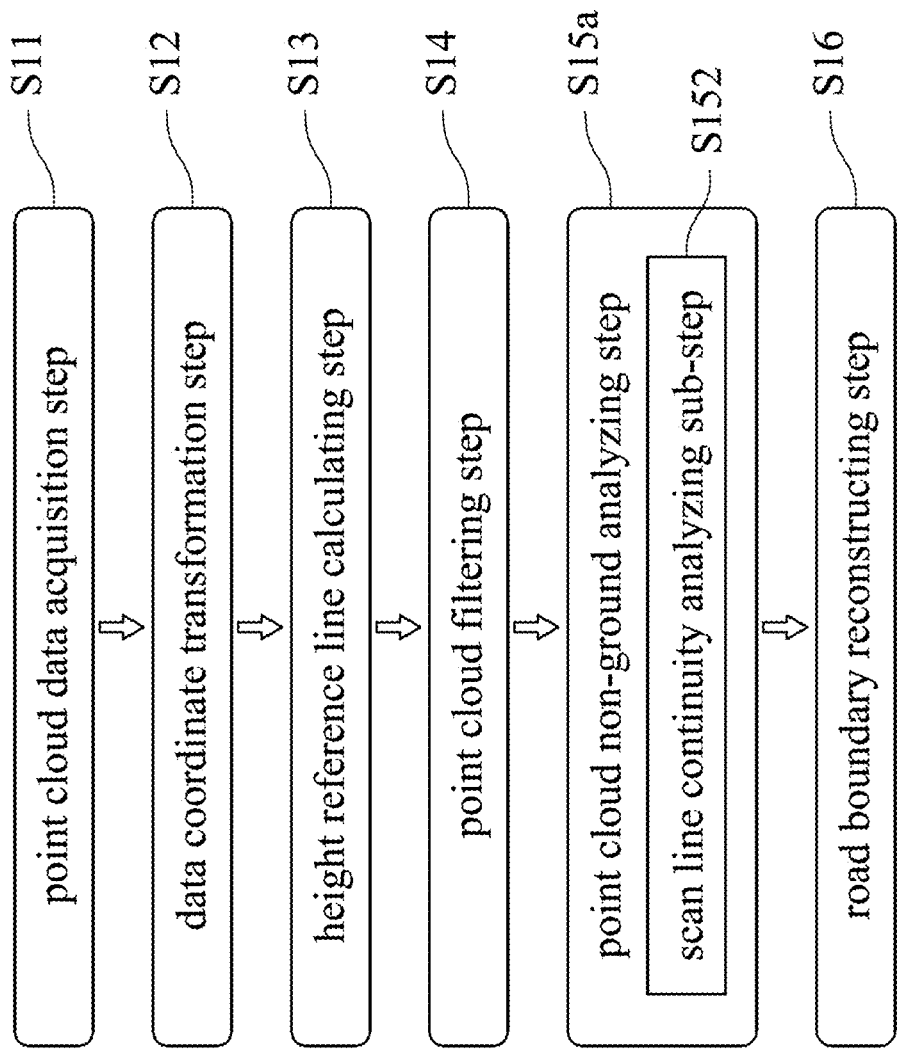
FIG. 10 shows a flow chart of a dynamic road surface detecting method based on a three-dimensional sensor according to another embodiment of the present disclosure.

FIG. 10 shows a flow chart of a dynamic road surface detecting method 100a based on a three-dimensional sensor 130 according to another embodiment of the present disclosure. The dynamic road surface detecting method 100a includes a point cloud data acquisition step S11, a data coordinate transformation step S12, a height reference line calculating step S13, a point cloud filtering step S14, a point cloud non-ground analyzing step S15a and a road boundary reconstructing step S16. In FIG. 10, the detail of the point cloud data acquisition step S11, the data coordinate transformation step S12, the height reference line calculating step S13, the point cloud filtering step S14 and the road boundary reconstructing step S16 is the same as that of FIG. 1, and will not be described again herein. In FIG. 10, the dynamic road surface detecting method 100a further includes the point cloud non-ground analyzing step S15a. The point cloud non-ground analyzing step S15a only includes a scan line continuity analyzing sub-step S152 which is the same as the scan line continuity analyzing sub-step S152 of FIG. 1. In other words, the discontinuous points A1 obtained by the scan line continuity analyzing sub-step S152 represent the scan points $P_{\theta,i}$ of the road boundary 124 or obstacles. Then, the road boundary reconstructing step S16 is for utilizing the point cloud processing module 140 to link the discontinuous points A1 to form the road boundary 124.

Figure 11:
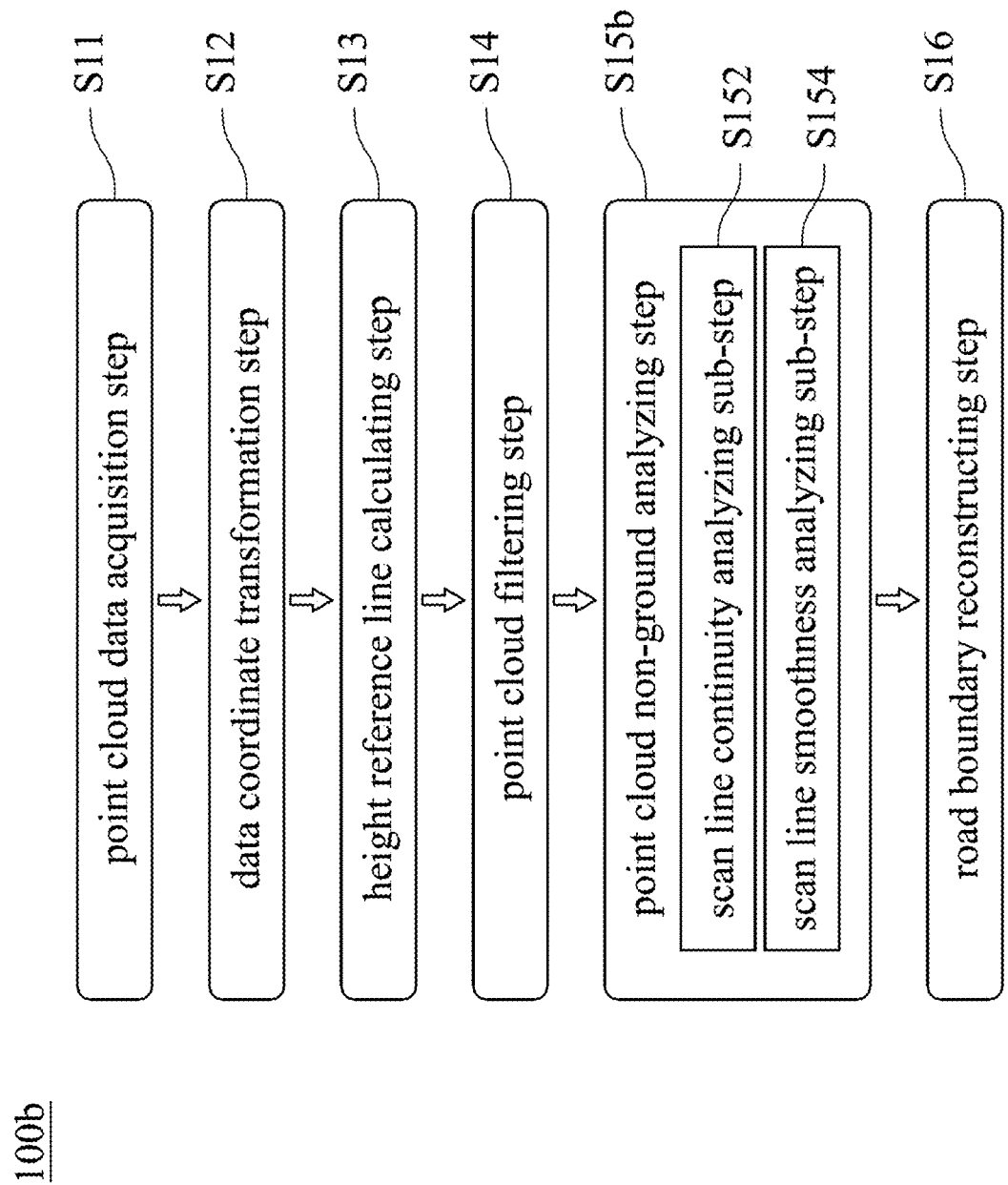
FIG. 11 shows a flow chart of a dynamic road surface detecting method based on a three-dimensional sensor according to further another embodiment of the present disclosure.

FIG. 11 shows a flow chart of a dynamic road surface detecting method 100b based on a three-dimensional sensor 130 according to further another embodiment of the present disclosure. The dynamic road surface detecting method 100b includes a point cloud data acquisition step S11, a data coordinate transformation step S12, a height reference line calculating step S13, a point cloud filtering step S14, a point cloud non-ground analyzing step S15b and a road boundary reconstructing step S16. In FIG. 11, the detail of the point cloud data acquisition step S11, the data coordinate transformation step S12, the height reference line calculating step S13, the point cloud filtering step S14 and the road boundary reconstructing step S16 is the same as that of FIG. 1, and will not be described again herein. In FIG. 11, the dynamic road surface detecting method 100b further includes the point cloud non-ground analyzing step S15b. The point cloud non-ground analyzing step S15b includes a scan line continuity analyzing sub-step S152 and a scan line smoothness analyzing sub-step S154 which are the same as the scan line continuity analyzing sub-step S152 and the scan line smoothness analyzing sub-step S154 of FIG. 1. In other words, the discontinuous points A1 obtained by the scan line continuity analyzing sub-step S152 and the non-smooth points A2 obtained by the scan line smoothness analyzing sub-step S154 represent the scan points $P_{\theta,i}$ of the road boundary 124 or obstacles. Then, the road boundary reconstructing step S16 is for utilizing the point cloud processing module 140 to link the discontinuous points A1 and the non-smooth points A2 to form the road boundary 124. Furthermore, in FIGS. 1, 10 and 11, it can be seen that the reconstruction of the road boundary 124 can be freely selected. If the method utilizes single analyzing sub-step (e.g., FIG. 10), the reconstruction may be accomplished with relatively short computational time and relatively low accuracy. On the contrary, if the method utilizes multiple analyzing sub-steps (e.g., FIG. 1 or 11), the reconstruction may be accomplished with relatively long computational time and relatively high accuracy. No matter what the manner is, the dynamic road surface detecting methods 100, 100a, 100b of the present disclosure can effectively obtain an area of the ground surface 122, so that the methods of the present disclosure can be used for autonomous driving and improving accuracy of the obstacle detection and object classification by removing the area of the ground surface 122, thereby significantly increasing driving safety.

According to the aforementioned embodiments and examples, the advantages of the present disclosure are described as follows.

1. The dynamic road surface detecting method of the present disclosure may use the folding line fitting algorithm of the height reference line calculating step to improve accuracy of the obstacle detection and object classification. In addition, the point cloud processing module removes noise of the scan points and synthesizes the discontinuous points, the non-smooth points and the large slope points into a plurality of road boundary segments or a plurality of obstacle segments so as to effectively obtain the precise area of the ground surface for a wider range of scenarios and more complicated road surfaces.

2. The dynamic road surface detecting method of the present disclosure utilizes the point cloud non-ground analyzing step and the road boundary reconstructing step to systematically reconstruct the discontinuous points, the non-smooth points and the large slope points to form the road boundary, so that the method of the present disclosure can be adaptable to a changeable road and dynamic vibrations of the moving vehicle.

3. The dynamic road surface detecting methods of the present disclosure can effectively obtain an area of the ground surface, so that the dynamic road surface detecting methods can be used for autonomous driving and improving accuracy of the obstacle detection and object classification by removing the area of the ground surface, thereby significantly increasing driving safety.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A dynamic road surface detecting method based on a three-dimensional sensor for detecting a road surface around a vehicle, the road surface having a ground surface and a road boundary, the dynamic road surface detecting method comprising:
providing a point cloud data acquisition step, wherein the point cloud data acquisition step is for providing the three-dimensional sensor to emit a plurality of laser-emitting points to the road surface, and then the three-dimensional sensor receives the laser-emitting points reflected from the road surface to generate a plurality of three-dimensional sensor scan point coordinates and transmits the three-dimensional sensor scan point coordinates to a point cloud processing module;
providing a data coordinate transformation step, wherein the data coordinate transformation step is for utilizing the point cloud processing module to transform the three-dimensional sensor scan point coordinates to a plurality of vehicle scan point coordinates according to a coordinate translation equation, the vehicle scan point coordinates are divided into a plurality of scan lines, and each of the scan lines has a plurality of scan points;
providing a height reference line calculating step, wherein the height reference line calculating step is for utilizing the point cloud processing module to transform a plurality of vehicle coordinate height values of the vehicle scan point coordinates to a road surface height reference line according to a folding line fitting algorithm;
providing a point cloud non-ground analyzing step, comprising:
providing a scan line continuity analyzing sub-step, wherein the scan line continuity analyzing sub-step is for utilizing the point cloud processing module to analyze an absolute difference of two scan point height values of any two adjacent scan points on each of the scan lines, when the absolute difference is greater than a predetermined difference value, each of the two adjacent scan points is regarded as a discontinuous point; and
providing a road boundary reconstructing step, wherein the road boundary reconstructing step is for utilizing the point cloud processing module to link the discontinuous points to form the road boundary;
wherein the folding line fitting algorithm is for equally dividing a region of the road surface into a plurality of panes along a traveling direction, some of the scan points are located in the region, each of some of the panes has at least one of the scan points, the point cloud processing module stores a predetermined valid pane point number value and counts a scan point number value which represents a number of the scan points of the vehicle scan point coordinates located in each of the panes, and then the point cloud processing module compares the predetermined valid pane point number value with the scan point number value.

2. The dynamic road surface detecting method of claim 1, wherein the three-dimensional sensor comprises a three-dimensional light detection and ranging (LIDAR) sensor, the three-dimensional LIDAR sensor has a horizontal viewing angle, a vertical viewing angle and a rotational frequency, the horizontal viewing angle is equal to 360 degrees, the vertical viewing angle is equal to or greater than −15 degrees and is equal to or smaller than +15 degrees, the rotational frequency is equal to 10 Hz, and the three-dimensional LIDAR sensor is signally connected to the point cloud processing module through an Ethernet cable.

3. The dynamic road surface detecting method of claim 1, wherein the coordinate translation equation comprises a vertical viewing angle, a roll angle, a height, the three-dimensional sensor scan point coordinates and the vehicle scan point coordinates, the vertical viewing angle is represented as $\theta$, the roll angle is represented as $\beta$, the height is represented as h, the three-dimensional sensor scan point coordinates are represented as (x',y',z'), the vehicle scan point coordinates are represented as (x,y,z), and the coordinate translation equation is described as follows:

$$\begin{bmatrix} x \\ y \\ z \end{bmatrix} = \begin{bmatrix} 0 \\ 0 \\ h \end{bmatrix} + \begin{bmatrix} \cos\beta & 0 & \sin\beta \\ 0 & 1 & 0 \\ -\sin\beta & 0 & \cos\beta \end{bmatrix} \times \begin{bmatrix} 1 & 0 & 0 \\ 0 & \cos\theta & \sin\theta \\ 0 & -\sin\theta & \cos\theta \end{bmatrix} \times \begin{bmatrix} x' \\ y' \\ z' \end{bmatrix}.$$

4. The dynamic road surface detecting method of claim 1, wherein
when the scan point number value is greater than the predetermined valid pane point number value, the pane corresponding to the scan point number value is regarded as a valid pane by the point cloud processing module; and
when the scan point number value is smaller than or equal to the predetermined valid pane point number value, the pane corresponding to the scan point number value is regarded as an invalid pane by the point cloud processing module.

5. The dynamic road surface detecting method of claim 4, wherein,
in the folding line fitting algorithm, the point cloud processing module stores a predetermined reference road slope and selects a minimum vehicle coordinate height value from the vehicle coordinate height values of the vehicle scan point coordinates in each of the valid panes, the point cloud processing module links two central points of two adjacent valid panes to form a central linking line, two heights of the two central points are equal to two minimum vehicle coordinate height values of the two adjacent valid panes, respectively, the central linking line has a linking slope, and the point cloud processing module compares the linking slope with the predetermined reference road slope;
wherein when the linking slope is greater than the predetermined reference road slope, one of the two valid panes which is farer away from the vehicle is regarded as a retrial invalid pane, and the other of the two valid panes is regarded as a retrial valid pane by the point cloud processing module; and
when the linking slope is smaller than or equal to the predetermined reference road slope, each of the two valid panes is regarded as the retrial valid pane by the point cloud processing module.

6. The dynamic road surface detecting method of claim 5, wherein,
in the folding line fitting algorithm, the point cloud processing module performs an interpolation algorithm to interpolate the retrial invalid panes and the invalid panes according to the retrial valid panes to generate the road surface height reference line.

7. The dynamic road surface detecting method of claim 1, further comprising:

providing a point cloud filtering step, wherein the point cloud filtering step is for utilizing the point cloud processing module to filter the vehicle scan point coordinates, the point cloud processing module stores a predetermined filtering height and generate a filtering line according to the predetermined filtering height and the road surface height reference line, the filtering line has a filtering line height value, the point cloud processing module removes a part of the scan points if the vehicle coordinate height values of the part of the scan points are greater than the filtering line height value.

8. The dynamic road surface detecting method of claim 1, wherein the point cloud non-ground analyzing step further comprises:

providing a scan line smoothness analyzing sub-step, wherein the scan line smoothness analyzing sub-step is for utilizing the point cloud processing module to analyze the scan points of each of the scan lines to generate a smoothness criterion equation, the smoothness condition equation comprises a left slope and a right slope, the point cloud processing module stores a predetermined non-smooth point condition value and compares the smoothness criterion equation with the predetermined non-smooth point condition value, the left slope is represented as $S_{i,k,left}$, the right slope is represented as $S_{i,k,right}$, the smoothness criterion equation is represented as SC and described as follows:

$$SC = \left| \frac{S_{i,k,right} - S_{i,k,left}}{1 + S_{i,k,right} \times S_{i,k,left}} \right|;$$

wherein when the smoothness criterion equation is greater than the predetermined non-smooth point condition value, each of the scan points corresponding to the smoothness criterion equation is regarded as a non-smooth point.

9. The dynamic road surface detecting method of claim 1, wherein the point cloud non-ground analyzing step further comprises:

providing a scan line slope analyzing sub-step, wherein the scan line slope analyzing sub-step is for utilizing the point cloud processing module to analyze the scan points of each of the scan lines to generate a slope criterion equation, the point cloud processing module stores a predetermined tolerable slope condition value and compares the slope criterion equation with the predetermined tolerable slope condition value, the slope criterion equation is represented as SR, the two adjacent scan points on each of the scan lines are represented as $(x_{\theta,j}, y_{\theta,j}, z_{\theta,j})$ and $(x_{\theta,j+1}, y_{\theta,j+1}, z_{\theta,j+1})$, respectively, and the slope criterion equation is described as follows:

$$SR = \frac{|z_{\theta,j+1} - z_{\theta,j}|}{\sqrt{(x_{\theta,j+1} - x_{\theta,j})^2 + (y_{\theta,j+1} - y_{\theta,j})^2}};$$

wherein when the slope criterion equation is greater than the predetermined tolerable slope condition value, each of the scan points corresponding to the slope criterion equation is regarded as a large slope point.

10. A dynamic road surface detecting method based on a three-dimensional sensor for detecting a road surface around a vehicle, the road surface having a ground surface and a road boundary, the dynamic road surface detecting method comprising:

providing a point cloud data acquisition step, wherein the point cloud data acquisition step is for providing the three-dimensional sensor to emit a plurality of laser-emitting points to the road surface, and then the three-dimensional sensor receives the laser-emitting points reflected from the road surface to generate a plurality of three-dimensional sensor scan point coordinates and transmits the three-dimensional sensor scan point coordinates to a point cloud processing module;

providing a data coordinate transformation step, wherein the data coordinate transformation step is for utilizing the point cloud processing module to transform the three-dimensional sensor scan point coordinates to a plurality of vehicle scan point coordinates according to a coordinate translation equation, the vehicle scan point coordinates are divided into a plurality of scan lines, and each of the scan lines has a plurality of scan points;

providing a height reference line calculating step, wherein the height reference line calculating step is for utilizing the point cloud processing module to transform a plurality of vehicle coordinate height values of the vehicle scan point coordinates to a road surface height reference line according to a folding line fitting algorithm;

providing a point cloud non-ground analyzing step, comprising:

providing a scan line smoothness analyzing sub-step, wherein the scan line smoothness analyzing sub-step is for utilizing the point cloud processing module to analyze the scan points of each of the scan lines to generate a smoothness criterion equation, the point cloud processing module stores a predetermined non-smooth point condition value and compares the smoothness criterion equation with the predetermined non-smooth point condition value, when the smoothness criterion equation is greater than the predetermined non-smooth point condition value, each of the scan points corresponding to the smoothness criterion equation is regarded as a non-smooth point; and providing a road boundary reconstructing step, wherein the road boundary reconstructing step is for utilizing the point cloud processing module to link the non-smooth points to form the road boundary;

wherein the folding line fitting algorithm is for equally dividing a region of the road surface into a plurality of panes along a traveling direction, some of the scan points are located in the region, each of some of the panes has at least one of the scan points, the point cloud processing module stores a predetermined valid pane point number value and counts a scan point number value which represents a number of the scan points of the vehicle scan point coordinates located in each of the panes, and then the point cloud processing module compares the predetermined valid pane point number value with the scan point number value.

11. The dynamic road surface detecting method of claim 10, wherein, in the scan line smoothness analyzing sub-step, the smoothness condition equation comprises a left slope and a right slope, the left slope is represented as $S_{i,k,left}$, the right slope is represented as $S_{i,k,right}$, the smoothness criterion equation is represented as SC and described as follows:

$$SC = \left| \frac{S_{i,k,right} - S_{i,k,left}}{1 + S_{i,k,right} \times S_{i,k,left}} \right|.$$

12. The dynamic road surface detecting method of claim 10, wherein the three-dimensional sensor comprises a three-dimensional light detection and ranging (LIDAR) sensor, the three-dimensional LIDAR sensor has a horizontal viewing angle, a vertical viewing angle and a rotational frequency, the horizontal viewing angle is equal to 360 degrees, the vertical viewing angle is equal to or greater than −15 degrees and is equal to or smaller than +15 degrees, the rotational frequency is equal to 10 Hz, and the three-dimensional LIDAR sensor is signally connected to the point cloud processing module through an Ethernet cable.

13. The dynamic road surface detecting method of claim 10, wherein the coordinate translation equation comprises a vertical viewing angle, a roll angle, a height, the three-dimensional sensor scan point coordinates and the vehicle scan point coordinates, the vertical viewing angle is represented as θ, the roll angle is represented as β, the height is represented as h, the three-dimensional sensor scan point coordinates are represented as (x',y',z'), the vehicle scan point coordinates are represented as (x,y,z), and the coordinate translation equation is described as follows:

$$\begin{bmatrix} x \\ y \\ z \end{bmatrix} = \begin{bmatrix} 0 \\ 0 \\ h \end{bmatrix} + \begin{bmatrix} \cos\beta & 0 & \sin\beta \\ 0 & 1 & 0 \\ -\sin\beta & 0 & \cos\beta \end{bmatrix} \times \begin{bmatrix} 1 & 0 & 0 \\ 0 & \cos\theta & \sin\theta \\ 0 & -\sin\theta & \cos\theta \end{bmatrix} \times \begin{bmatrix} x' \\ y' \\ z' \end{bmatrix}.$$

14. The dynamic road surface detecting method of claim 10, wherein
when the scan point number value is greater than the predetermined valid pane point number value, the pane corresponding to the scan point number value is regarded as a valid pane by the point cloud processing module; and
when the scan point number value is smaller than or equal to the predetermined valid pane point number value, the pane corresponding to the scan point number value is regarded as an invalid pane by the point cloud processing module.

15. The dynamic road surface detecting method of claim 14, wherein,
in the folding line fitting algorithm, the point cloud processing module stores a predetermined reference road slope and selects a minimum vehicle coordinate height value from the vehicle coordinate height values of the vehicle scan point coordinates in each of the valid panes, the point cloud processing module links two central points of two adjacent valid panes to form a central linking line, two heights of the two central points are equal to two minimum vehicle coordinate height values of the two adjacent valid panes, respectively, the central linking line has a linking slope, and the point cloud processing module compares the linking slope with the predetermined reference road slope;
wherein when the linking slope is greater than the predetermined reference road slope, one of the two valid panes which is farer away from the vehicle is regarded as a retrial invalid pane, and the other of the two valid panes is regarded as a retrial valid pane by the point cloud processing module; and
when the linking slope is smaller than or equal to the predetermined reference road slope, each of the two valid panes is regarded as the retrial valid pane by the point cloud processing module.

16. The dynamic road surface detecting method of claim 15, wherein,
in the folding line fitting algorithm, the point cloud processing module performs an interpolation algorithm to interpolate the retrial invalid panes and the invalid panes according to the retrial valid panes to generate the road surface height reference line.

17. The dynamic road surface detecting method of claim 10, further comprising:
providing a point cloud filtering step, wherein the point cloud filtering step is for utilizing the point cloud processing module to filter the vehicle scan point coordinates, the point cloud processing module stores a predetermined filtering height and generate a filtering line according to the predetermined filtering height and the road surface height reference line, the filtering line has at least a filtering line height value, the point cloud processing module removes a part of the scan points if the vehicle coordinate height values of the part of the scan points are greater than the filtering line height value.

18. The dynamic road surface detecting method of claim 10, wherein the point cloud non-ground analyzing step further comprises:
providing a scan line slope analyzing sub-step, wherein the scan line slope analyzing sub-step is for utilizing the point cloud processing module to analyze the scan points of each of the scan lines to generate a slope criterion equation, the point cloud processing module stores a predetermined tolerable slope condition value and compares the slope criterion equation with the predetermined tolerable slope condition value, the slope criterion equation is represented as SR, the two adjacent scan points on each of the scan lines are represented as $(x_{\theta,j}, y_{\theta,j}, z_{\theta,j})$ and $(x_{\theta,j+1}, y_{\theta,j+1}, z_{\theta,j+1})$, respectively, and the slope criterion equation is described as follows:

$$SR = \frac{|z_{\theta,j+1} - z_{\theta,j}|}{\sqrt{(x_{\theta,j+1} - x_{\theta,j})^2 + (y_{\theta,j+1} - y_{\theta,j})^2}};$$

wherein when the slope criterion equation is greater than the predetermined tolerable slope condition value, each of the scan points corresponding to the slope criterion equation is regarded as a large slope point.

* * * * *